United States Patent
Conroy et al.

(10) Patent No.: US 9,175,398 B2
(45) Date of Patent: Nov. 3, 2015

(54) METALLIC MATERIALS WITH EMBEDDED LUMINESCENT PARTICLES

(71) Applicant: The Royal Mint Limited, Llantrisant, Pontyclun (GB)

(72) Inventors: Jeffrey L. Conroy, Allen, TX (US); Philip B. Forshee, McKinney, TX (US); James A. Shearer, Allen, TX (US)

(73) Assignee: The Royal Mint Limited, Llantrisant, Pontyclun (GB)

( * ) Notice: Subject to any disclaimer, the term of this patent is extended or adjusted under 35 U.S.C. 154(b) by 0 days.

(21) Appl. No.: 14/310,246

(22) Filed: Jun. 20, 2014

(65) Prior Publication Data

US 2014/0302234 A1    Oct. 9, 2014

Related U.S. Application Data

(63) Continuation of application No. 13/156,794, filed on Jun. 9, 2011.

(60) Provisional application No. 61/353,333, filed on Jun. 10, 2010.

(51) Int. Cl.
*C23C 18/16*     (2006.01)
*G07D 7/12*     (2006.01)
(Continued)

(52) U.S. Cl.
CPC ......... *C23C 18/1662* (2013.01); *C23C 18/1637* (2013.01); *C23C 18/1646* (2013.01); *C23C 18/31* (2013.01); *C25D 3/12* (2013.01); *C25D 3/22* (2013.01); *C25D 3/38* (2013.01); *C25D 5/02* (2013.01); *C25D 5/10* (2013.01); *C25D 15/00* (2013.01); *C25D 17/16* (2013.01);
(Continued)

(58) Field of Classification Search
CPC ............ C25D 3/12; C25D 17/16; G07D 5/00; G07D 7/12; C23C 18/1662
USPC ............................................ 250/458.1–461.1
See application file for complete search history.

(56) References Cited

U.S. PATENT DOCUMENTS 1,899,679 A * 2/1933 Fink et al. .................. 205/143
2,851,408 A 9/1958 Cerulli et al.
(Continued)

FOREIGN PATENT DOCUMENTS

WO    8402149 A1    6/1984
WO    WO8402149    *    6/1984 ............... C25D 5/48
(Continued)

OTHER PUBLICATIONS

Feldstein et al., "Composite coatings with light-emitting properties", Metal Finishing, Elsevier, New York, NY, vol. 97, No. 2, Feb. 1, 1999, pp. 87-90.*

(Continued)

*Primary Examiner* — David Porta
*Assistant Examiner* — Jeremy S Valentiner
(74) *Attorney, Agent, or Firm* — Banner & Witcoff, Ltd.

(57) ABSTRACT

Formation of an authentication element by deposition of a metal layer with embedded particles on a metal substrate, wherein the embedded particles are configured to convert energy from one wavelength to another. The embedded particles may be upconverters, downconverters, or phosphorescent phosphors, which can be detected and measured with analytical equipment when deposited in the metal layer. A metal substrate may include coinage.

12 Claims, 12 Drawing Sheets

(51) Int. Cl.
| | |
|---|---|
| C25D 5/02 | (2006.01) |
| C25D 3/12 | (2006.01) |
| C25D 3/22 | (2006.01) |
| C25D 3/38 | (2006.01) |
| C25D 5/10 | (2006.01) |
| C25D 15/00 | (2006.01) |
| C25D 17/16 | (2006.01) |
| G07D 5/00 | (2006.01) |
| C23C 18/31 | (2006.01) |
| G07F 7/08 | (2006.01) |

(52) U.S. Cl.
CPC .. *G07D5/00* (2013.01); *G07D 7/12* (2013.01); *C23C 18/1653* (2013.01); *G07F 7/0813* (2013.01); *Y10T 428/12493* (2015.01)

(56) References Cited

U.S. PATENT DOCUMENTS

| | | | |
|---|---|---|---|
| 3,617,743 A | 11/1971 | Rabatin et al. | |
| 3,798,173 A * | 3/1974 | Nath et al. | 252/301.4 F |
| 4,399,828 A * | 8/1983 | Kontos | 134/65 |
| 4,513,025 A | 4/1985 | Clark et al. | |
| 4,591,707 A | 5/1986 | Stenzel et al. | |
| 4,918,469 A | 4/1990 | McGrew | |
| 5,514,479 A | 5/1996 | Feldstein | |
| 5,516,591 A | 5/1996 | Feldstein | |
| 5,834,065 A * | 11/1998 | Feldstein | 427/405 |
| 6,029,891 A | 2/2000 | Freeman et al. | |
| 6,254,002 B1 | 7/2001 | Litman | |
| 6,572,784 B1 * | 6/2003 | Coombs et al. | 252/301.16 |
| 2003/0089611 A1 | 5/2003 | Nayfeh et al. | |
| 2003/0173532 A1 * | 9/2003 | Takahashi et al. | 250/584 |
| 2005/0242956 A1 | 11/2005 | Sorkine | |
| 2008/0156654 A1 | 7/2008 | Wang et al. | |
| 2008/0210757 A1 | 9/2008 | Burden et al. | |
| 2010/0227141 A1 | 9/2010 | Morales | |

FOREIGN PATENT DOCUMENTS

| | | | |
|---|---|---|---|
| WO | WO 03044276 A1 * | 5/2003 | D21H 21/48 |
| WO | 03065296 A1 | 8/2003 | |
| WO | 2007120762 A2 | 10/2007 | |
| WO | 2009017506 A2 | 2/2009 | |

OTHER PUBLICATIONS

Das et al., "Co-deposition of Luminescent Particles with Electroless Nickel," Transactions of the Institute of Metal Finishing, Maney Publishing, Birmingham, GB, vol. 4, No. 80, Jul. 1, 2002, pp. 128-131.

Gul et al., Characteristics of electro-co-deposited Ni-Al2O3 nanoparticle reinforced metal matrix composite (MMC) Coatings, Elsevier, Wear 267 (2009), pp. 976-990.

Xue et al., "Corrosion Resistance of Ni-CeO2 Nanocomposite Coatings Prepared by Pulse Electrodepositio in an Ultrasonic Field," Journal of Inorganic Materials, vol. 25, No. 5, May 2010, pp. 522-526.

Lampke et al, "Details of Crystalline Growth in co-deposited electroplated nickel films with hard (nano) particles," Science Direct, Applied Surface Science, 253, Mar. 27, 2006, pp. 2399-2408.

Sen et al., "Effect of surfactant on the co-electrodeposition of the nano-sized ceria particle in the nickel matrix," Journal of Alloys and Compounds, 489, (2010), 650-658.

Zanella et al., "Effect of ultrasound vibration during electrodeposition of Ni-SiC nanocomposite coating," Surface Engineering (2010), vol. 26, No. 7, pp. 511-519.

Gonzalez-Garcia et al., "Effects of Ultrasound on the Electrodeposition of Lead Dioxide on Glassy Carbon Eletrodes," Universidad de Alicante, email address: vicente.montiel@ua.es, 14 pages.

Grosso et al., "Electrophoretic Deposition of Luuminescent Materials," J. Electrochem Soc: Electrochemical Tecnhology, Nov. 1970, pp. 1456-1459.

Wielage et al., "Electroplated nickel composites with mircon- to nano-sized particles," Key Engineering Materials vol. 384, (2008), pp. 283-309.

Kieda et al., Immobilization of TiO2 Photocatalyst Particles on Stainless Steel Substrates by Electrolytically Deposited Pd and Cu, Journal of the Ceramins Society of Japan, 114, 1, (2006), pp. 42-45.

Bahadormanesh et al., "The kinetics of Ni-Co/SiC composite coatings electrodeposition," Jounral of Alloys and Compounds, vol. 504, (2010), pp. 514-518.

Xia et al., "Preparation and characterization of Nano Ni-TiN coatings depoatied by ultrasonic electrodeposition," Journal of Alloys and Compounds, vol. 490, (2010), pp. 431-435.

Xue et al., Sliding wear behaviors of electrodeposited nickel composite coatings containing micrometer and nanometer La2O3 particles, J. Mater Sci vol. 41, (2006), pp. 1781-1784.

Lajevardi et al, "Synthesis and mechanical properties of nickel-titania composite coatings,"Materials and Corrosion, 2011, vol. 62, No. 1, pp. 29-34.

Dietrich et al., "Ultrasound technique as a tool for high-rate incorporation of Al2O3 in NiCo layers," J. Solid State Electrochem (2011), vol. 15, pp. 1041-1048.

International Bureau, "International Search Report and Written Opinion," PCT/US2011/039918, Dec. 13, 2011, 16 pages.

Smith et al., "Spatially Selective Electrochemical Deposition of Composite Films of Metal and Luminescent Si Nanoparticles," Chemical Physics Lettes, vol. 372, No. 3-4, Apr. 29, 2003, pp. 415-418.

International Bureau, "Invitation to Pay Additional Fees and Partial Search Report," PCT/US2011/039918, Sep. 26, 2011, 8 pages.

* cited by examiner

METALLIC MATERIALS WITH EMBEDDED LUMINESCENT PARTICLES

This application is a continuation of U.S. application Ser. No. 13/156,794, filed on Jun. 9, 2011, and claims benefit to U.S. Provisional Patent Application Ser. No. 61/353,333, filed Jun. 10, 2010, both of which are hereby incorporated by reference in their entirety for any and all non-limiting purposes.

TECHNICAL FIELD

This invention relates in general to metallic materials, and more particularly to embedding luminescent elements in a metal object, including coinage.

BACKGROUND

Metal parts, such as automobile parts, medical devices, coins, etc., are regularly counterfeited. This illegal practice is widespread and has a negative economic impact on the producers of the genuine parts and, most importantly, on the consumers. Adding a security element to metal parts through doping the metal is typically limited to the addition of other metallic elements that can survive casting and other high temperature processes. Many metals and alloys used in high value parts, such as aircraft parts or coinage, are limited in their available variability of the composition, because of strict specifications on compositions to achieve other requisite properties, such as strength or wear resistance. Alternatively available technologies for metal parts, such as with paints and coatings, etched barcodes, or other external security elements, are easily removed or defaced.

Some metal parts (e.g., aircraft parts) are manufactured with very tight tolerances and are electroplated to ensure a smooth surface for an extended mean time between failures. Inorganic particulates (e.g., silicon carbide particles, boron nitride particles, diamond particles and so forth) may be co-deposited during the electroplating process to augment the deposited layer's ability to become more wear resistant. Additionally, particles with lubricating characteristics, such as graphite or Teflon, may be added in an electrodeposited layer to extend the lifetime of a metal part.

SUMMARY

A method of securitizing a metal part that has not been exploited for authentication purposes is plating with a metal layer. Metal plated layers are typically optically dense, and therefore not well suited for carrying optical security materials (materials that are optically detectable under certain conditions). Metal plating processes are also not conducive to the co-deposition of a dissimilar material, such as an optical security material. Embodiments of the present invention describe processes to incorporate optical security elements that provide security, anti-counterfeiting, and/or name brand protection for objects that are subjected to this type of finishing. Using a metal matrix to envelop the luminescent particles enables a better adhesion to the underlying surface, which extends the lifetime of the optical feature over that of an ink, paint, or varnish. Moreover, since the security materials may be incorporated into an overall existing manufacturing process, an additional procedural step of applying a security material in a varnish, etc. may not be needed.

A novel attribute of embodiments of the present invention is incorporating an inorganic anti-counterfeiting feature within a metal matrix. Another novel attribute of embodiments of the present invention is an ability to change security elements at different stages of electrodeposition, which provides for an ability to detect different security elements at various wear stages of a particular part. Another novel attribute of embodiments of the present invention is a controlling of a plating barrel with intermittent stops of varying times to enhance embedding of particles, as such tumbling can easily dislodge deposited particles from the metal layer.

Incorporating an authenticating feature on metal surfaces with paints, inks, and other similar topical surface treatments have a disadvantage that they allow for a simple removal of security features where durability of the feature may be required. An advantage of embodiments of the present invention allows for the authenticating feature to be essentially built in along with the metal coating and remain intact as long as the deposited composite metal coating is visible, which, for the most part, may be the lifetime of the part. Embodiments of the present invention also enable a metal part to be more wear resistant due to the composite layer, as the ceramic particles are much harder than the metal matrix that is co-deposited during electrolysis.

DETAILED DESCRIPTION

Figure 1:
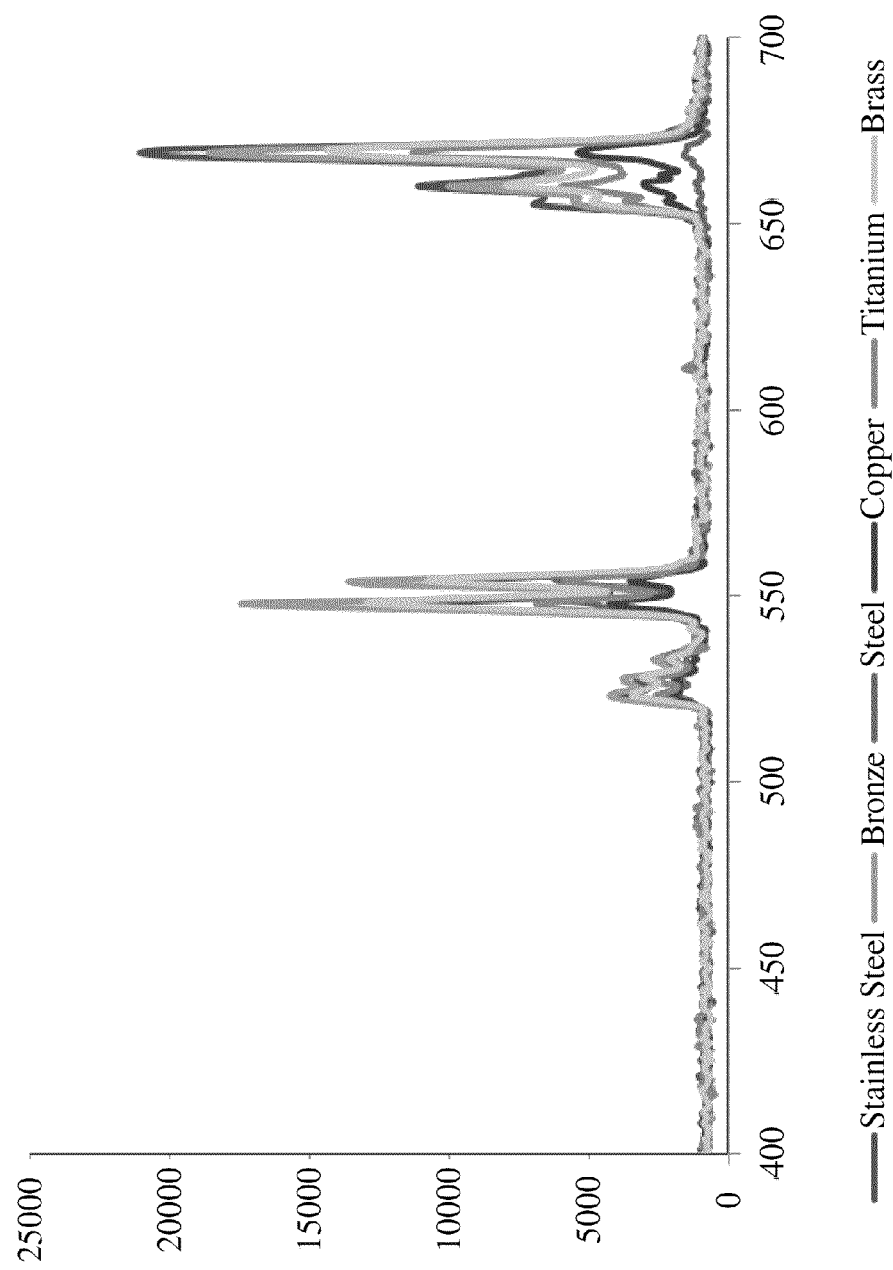
FIG. 1 shows emission scans of metal substrates (e.g., metal washers) after plating.

In an electroplating (also referred to as electro-deposition) process, a metal anode (metal to be plated) and cathode are connected to an external supply of direct current, most commonly, a rectifier. The positive terminal of the supply is connected to the anode and the negative terminal is connected to the cathode (i.e., the substrate on which plating is desired). Both the anode and cathode are placed in the plating bath containing a solution of the desired metal salt to be plated.

When the external power supply is switched on, the metal cations from the bath solution undergo an electronic reduction (to their zero valance state) on the surface of the cathode to form the metallic plated layer (e.g., Ni+2-->Ni+0). Concurrently, the zero valence metal, which comprises the anode, undergoes an electronic oxidation whereby metal ions are generated, which serves to replenish the plating bath (e.g., Ni+0-->Ni+2). Correspondingly, additional metal ions from the plating solution then add to the metal site that was just plated by the same mechanism.

Because the electroplating process occurs on the surfaces of the metal objects, the metal ion is incorporated onto the surface of the substrate via metallic bonding, which is of magnitudes stronger than a coating applied as an ink, paint, or varnish to the metal substrate. Such coatings do not create metallic bonds between the atoms of the plating material and the atoms of the metal substrate being plated. Therefore, in embodiments of the present invention disclosed herein, a metal layer electroplated on a metal substrate creates an object that is structurally different than a coating that is deposited on a metal substrate as an ink, paint, or varnish, or any other similar composition. Thus, an electroplated metal layer on a metal substrate defines a structure that is different than a metal substrate with an ink, paint, or varnish, or any other similar composition, deposited thereon.

Embodiments of the present invention herein disclose formation of an authentication element by deposition on a substrate of one or more metal layers with embedded particles, such as inorganic particles, wherein the embedded particles are configured to convert received incident (excitation) energy from one wavelength to another, such as a first ultraviolet wavelength to a second ultraviolet wavelength, an ultraviolet wavelength to a visible wavelength, an infrared wavelength to a visible wavelength, a first infrared wavelength to a second infrared wavelength, etc. (though the particles may be configured to emit the same wavelength of energy as the excitation energy). For example, a metal layer may contain embedded distributed inorganic crystal particles comprised of lanthanide-based rare earth doped phosphors that convert energy of one wavelength to another wavelength, whereby the inorganic crystal particles are brought to an excited state by receipt of a particular energy source that creates an energy transfer that gives off a photon(s) of a particular wavelength as a byproduct of the energy conversion process. This category of materials includes common upconverters and downconverters, such as rare earth oxides, oxysulfides, fluorides, etc. Those skilled in the art of ceramic composite materials understand how these solid state particles function as energy conversion devices.

As an example application of embodiments of the present invention, a manufacturer's liability may be called into question due to the failure of a metal component from counterfeiting, poor craftsmanship, or inadequate quality control. An identification mechanism in accordance with embodiments of the present invention enables the detection and determination of the authenticity of the metal component, which may exonerate or indicate the liability of such a manufacturer. Presently, many manufacturers have experienced increased liability due to the enormous amount of counterfeit parts that are common in today's marketplace.

Furthermore, by the inclusion of the luminescent particles disclosed herein within a metal layer plated on coinage, it enables the rapid determination and authentication of a multitude of denominational coin currencies in order to thwart the increasing amount of anti-counterfeiting of the world's coin currency. An identification mechanism in accordance with embodiments of the present invention may be applied to coins, such as those utilized by casinos for slot machines, the service and recreational vending industries, commemorative coinage, prestigious medals, and circuit board and silicon chip industries, to name a few.

Figure 11:
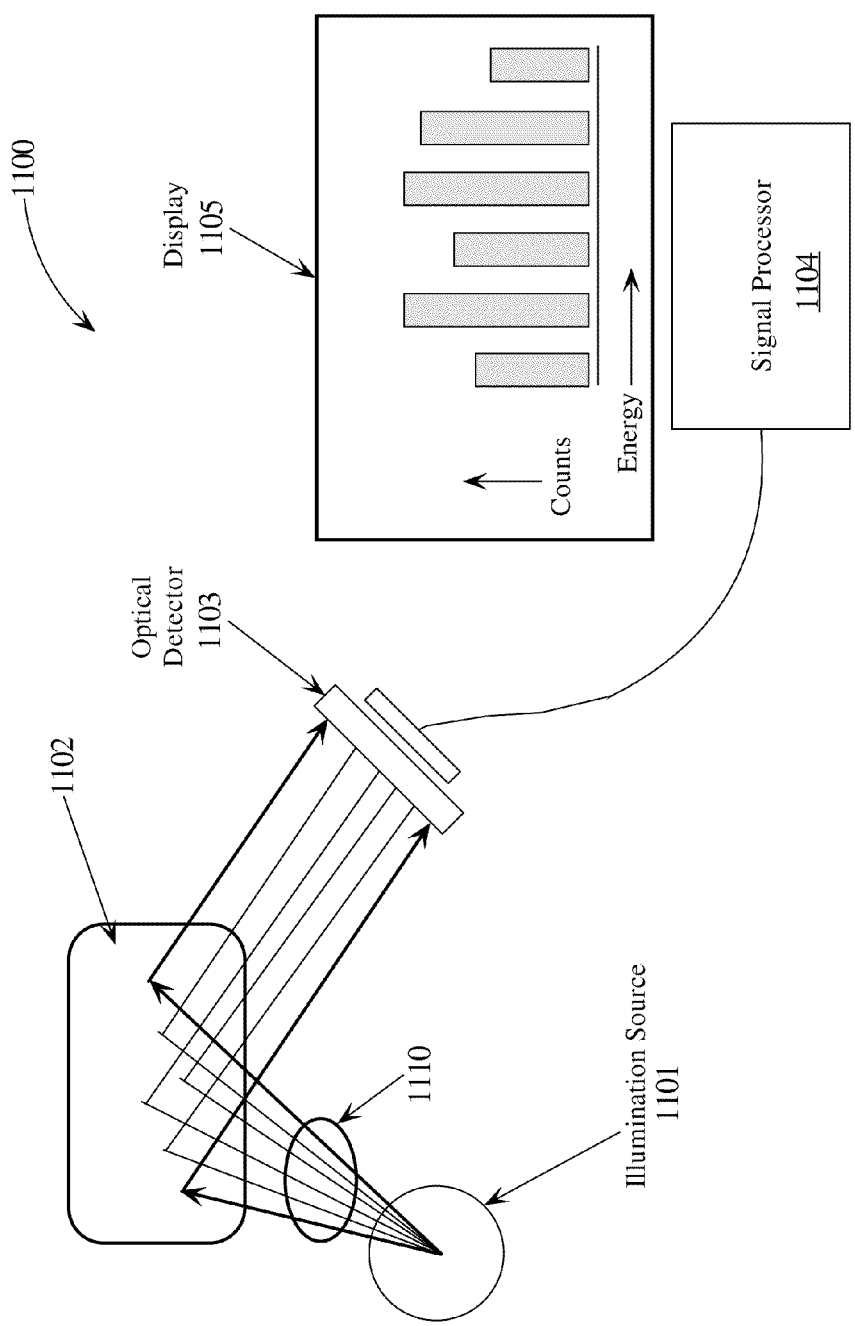
FIG. 11 illustrates an authentication process according to embodiments of the present invention.

Upconverters, downconverters, and phosphorescent phosphors all can be detected and measured with the proper analytical equipment when properly deposited in a plating layer as described herein. FIG. 11 illustrates an example of an authentication system and process 1100 in accordance with embodiments of the present invention. An illumination source 1101 emits a wavelength(s) of energy (e.g., light) 1110 at a metal substrate 1102 with one or more layers having the aforementioned particle(s) (or any other luminescent particles disclosed herein or their equivalents), which then emit energy at a wavelength as detected by an optical detector 1103. The particles may be configured to emit one or more desired wavelengths of energy, which may be at a different wavelength(s) as the excitation energy. A signal processor 1104, and optional display 1105, may be utilized for analyzing the detected signals and for making an authentication determination.

There are certain plating techniques, such as dip plating (see FIG. 9), rack plating, barrel plating (see FIG. 8), and electroless plating (see FIG. 10), that are described herein according to embodiments of the present invention. Regardless of the plating method used, a successful utilization of optical materials as an authentication method in a plating layer entails a careful selection of the particle sizes, plating chemistry, and plating conditions to arrive at a homogenous plating layer containing the optical materials. As further discussed herein, conditions that would cause the phosphor materials to deposit too quickly may lead to embedding the phosphor materials under an optically opaque plating layer, thus blocking the requisite optical signal required for authentication. Conversely, deposition of plating layers with phosphor-rich surface layers may result in an optically good feature, but would be compromised by wear or attempts to remove the surface plating to attenuate the authentication element. Plating conditions that would lead to a slow incorporation of phosphor materials may lead to inadequate amounts of phosphor incorporation, again with inadequate optical signal strength for proper authentication purposes. Herein are disclosed characteristics that result in optimal incorporation rates of particles of appropriate size for the authentication of these substrates.

Figure 3:
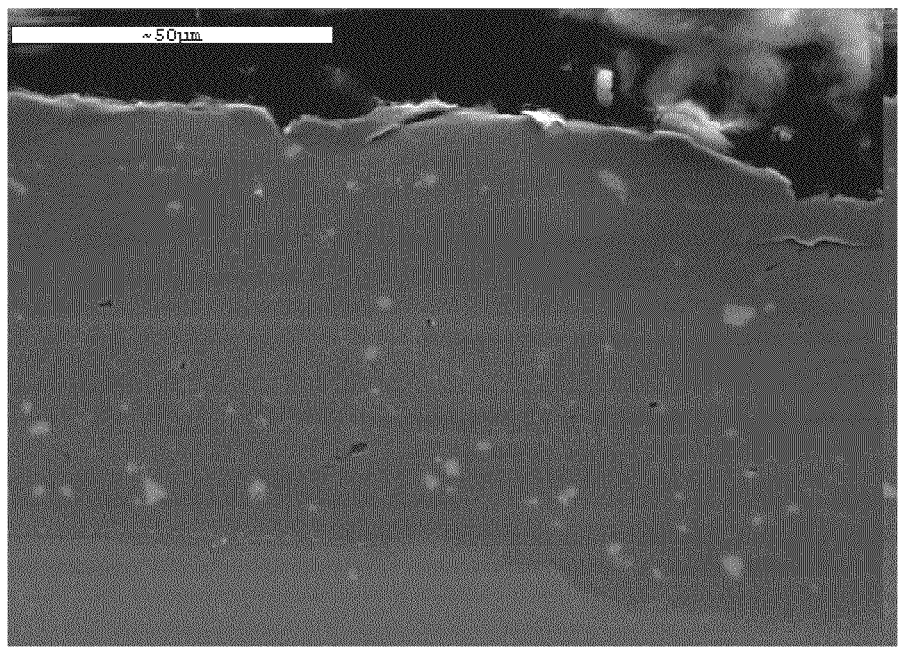
FIG. 3 shows an SEM image of a plated metal substrate with embedded phosphor particles, wherein light colored specs are phosphor material.
Figure 12C:
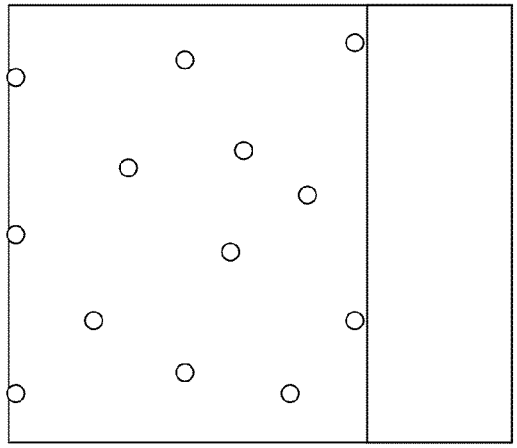
FIG. 12C illustrates an example of a substrate with a plated metal layer that contains a distribution of luminescent particles throughout the plated layer.
Figure 12B:
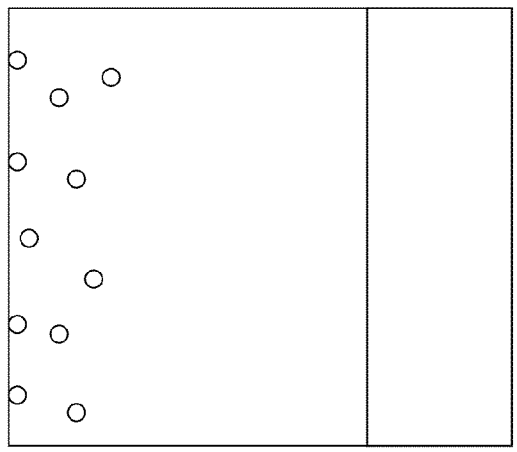
FIG. 12B illustrates an example of a substrate with a plated metal layer that contains a distribution of luminescent particles embedded on or near the surface of the plated metal layer.
Figure 12A:
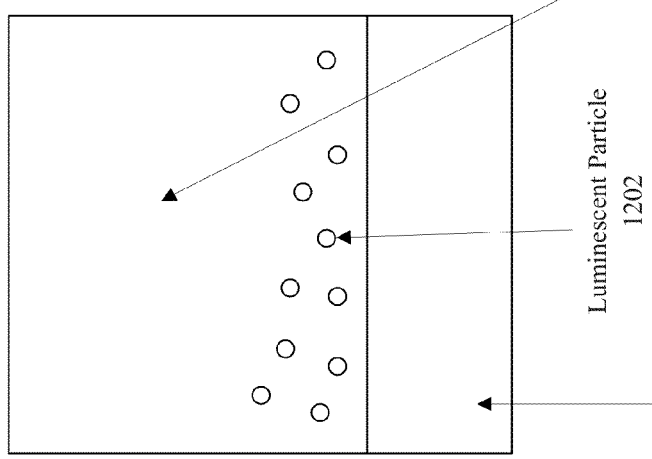
FIG. 12A illustrates an example of a substrate with a plated metal layer that contains a distribution of luminescent particles deeply embedded into a lower portion of the plated metal layer.

In embodiments of the present invention, the metal layers may be deposited on the substrate to possess a uniform distribution of luminescent particles in the plated metal matrix (also referred to herein as the metal layer or plated metal layer). This uniform distribution of particles is advantageous in so far as it enables the detection of emissions, and hence the product's authenticity, from the luminescent phosphors throughout the lifecycle of the plated product. FIG. 12A illustrates an example of a plated substrate 1201 with a plated metal layer 1203 that contains a distribution of luminescent particles 1202 where a substantial majority, or all, of the particles 1202 are deeply embedded into a lower portion of the plated metal layer 1203, and as such, illumination light 1110 from the source 1101 will not be able to penetrate the metal matrix 1203 to interact with (excite) the luminescent particles 1202, which ultimately precludes detection 1103 of emitted energy from the particles 1202 present towards the lower portion of the layer 1203. FIG. 12B illustrates an example of a plated substrate 1201 with a plated metal layer 1203 that contains a distribution of luminescent particles 1202 where a substantial majority, or all, of the particles 1202 are embedded on or near the surface of the plated metal layer 1203. This enables the detection 1103 of emitted energy from the particles 1202; however, upon wear of the plated part over time, the particles 1202 will be worn away along with the plated metal layer 1203, which will preclude authentication of the product. FIG. 12C illustrates an example of a plated substrate 1201 with a plated metal layer 1203 that contains a distribution of luminescent particles 1202 substantially or effectively throughout the plated layer 1203. As a result, throughout the lifecycle of the plated product, including as wearing away of the plated metal layer 1203 occurs, particles 1202 disposed in the plated metal layer 1203 more near the substrate 1201 will become exposed as the surface metal layer 1203 wears away, thus allowing for the authentication of the product as long as any of the plated layer 1203 is present. The plating methods disclosed herein produce such a desirable distribution of luminescent particles as illustrated in FIG. 12C, as verified in the representative cross-section SEM image of FIG. 3, which shows such a plated metal substrate with embedded phosphor particles, wherein light colored specs are phosphor material.

In embodiments of the present invention disclosed herein in which the luminescent particles dispersed in the plating solution become physically distributed throughout the entirety of the metal matrix as this electroplated layer is being formed, such particles need to arrive at the cathode surface to be built into the plated metal layer and therefore, first have to be transported from the bath solution to the cathode surface. Further, the longer a particle is in contact with the cathode surface, the more likely it will be incorporated into the plated metal matrix, which ultimately gives rise to higher particle loading rates in the metal layer.

The properties of luminescent particles used for security applications are quite different than those of the particles previously mentioned that are utilized for wear resistance or lubrication. For example, the densities of silicon carbide, boron nitride, and diamond are around 3.2 g/cm$^3$, 2.1 g/cm$^3$, and 3.5 g/cm$^3$, respectively. Similarly, the densities of Teflon and graphite are both around 2.2 g/cm$^3$. These materials are significantly less dense than that of a typical luminescent security particle. For example, rare earth doped yttrium oxide-based phosphors have densities greater than 5.0 g/cm$^3$, and rare earth doped gadolinium oxide-based phosphors have densities greater than 7.4 g/cm$^3$. In part, due to the differences in densities between luminescent security particles and wear resistance and lubrication particles, previously established methods for incorporating these less dense materials into a metal layer are largely ineffective for security materials of this type.

Given the density of the particles is higher than that of the bath solution, over a short period of time, the particles will settle to the bottom of the plating bath, and hence will not be available to the cathode surface for incorporation. One approach to overcome this problem is to agitate the bath solution via mechanical stirring, or other means. However, too much agitation leads to a decrease of particle co-deposition, because the particles are swept away from the cathode surface before they are built in. Moreover, since the luminescent particles utilized in embodiments of the present invention are significantly denser than the conventional materials used in the electroplating processes (see previous discussion on densities of such particles), they require significantly more agitation in order to stay in suspension in the plating bath. An increase in agitation speed, means that the particles will possess a higher velocity within the solution, and therefore a lower mean residence time on the cathode surface. This results in a lower likelihood of particles resting on the cathode surface long enough for them to be incorporated into the metal matrix, and ultimately lower particle content in the plated metal layer.

Figure 8:
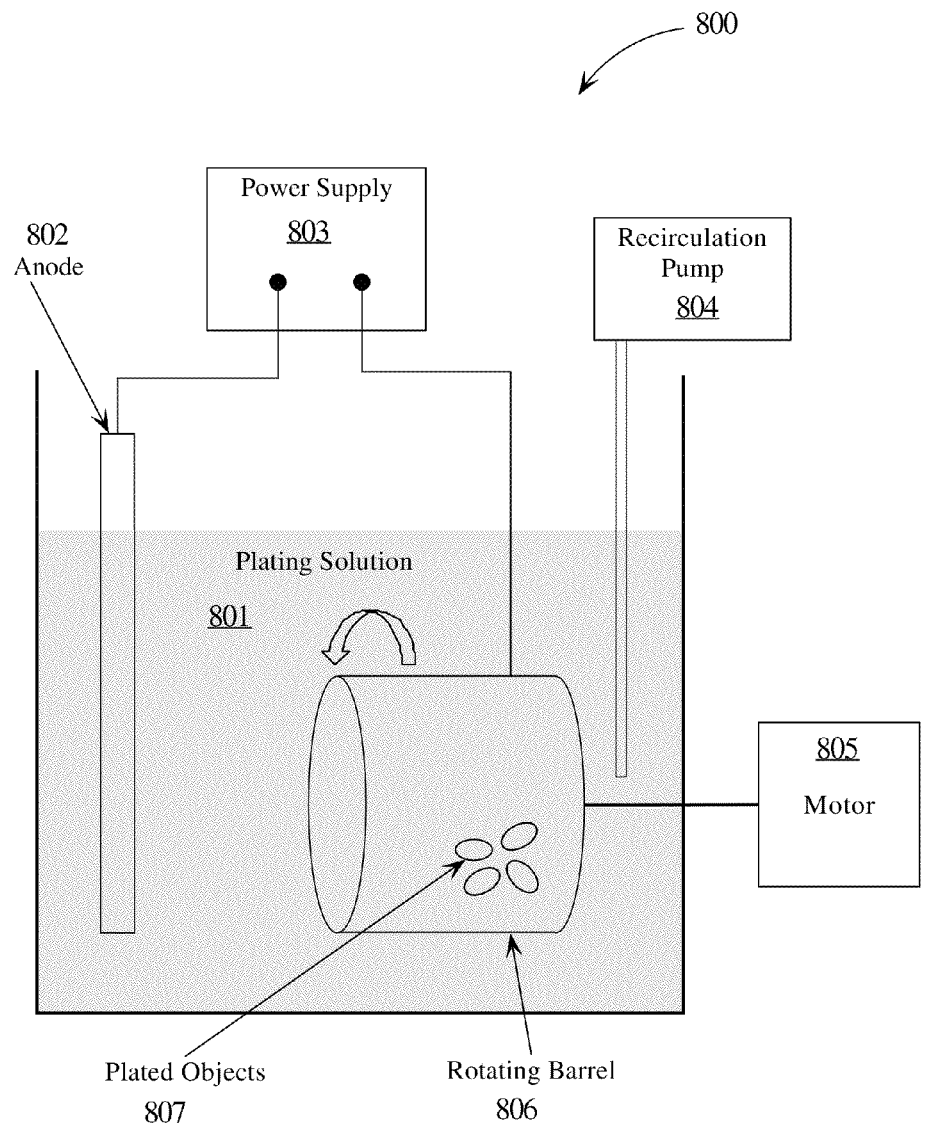
FIG. 8 illustrates a barrel plating system according to embodiments of the present invention.

This presents a problem in particular for metallic parts which are plated by barrel plating methods, such as illustrated in FIG. 8 and further discussed hereinafter. For barrel plating, the objects to be plated (e.g., coin blanks), are placed in a barrel-shaped enclosure, which traditionally is constantly rotated to ensure even plating on all surfaces of the objects. When attempts are made to incorporate luminescent security particles into objects using established barrel plating techniques/methods, a lower than desirable level of the luminescent particles are incorporated into the metal layer as a result of the constant rotation of the barrel, and hence constant motion of the plated objects. This constant motion of the parts being plated in conjunction with the velocity of the particles in suspension serves to dramatically decrease the mean residence time of the particles on the cathode surface. Since decreasing the mechanical agitation of the plating solution is undesirable, given the high density of the luminescent particles, it was discovered that by intermittently pausing the rotation of the plating barrel, a higher particle-cathode residence time was achieved, which results in higher particle loading rates in the electroplated layer. Additionally, the particle loading rate of the plated metal layer can be controlled to a desirable level by changing the amount of time the plating barrel is at rest (see experimental discussion and results in Table 1). For example, as further discussed herein, pausing the rotation of the barrel for 4 seconds may result in a lower loading of particles in the metal layer than by pausing the rotation of the barrel for 16 seconds.

It is also possible to control this effect by changing the rate at which the barrel is rotating, for example, a plating barrel rotating constantly at a rate of 30 or 40 revolutions per minute (rpm) will give a lower loading of particles in the metal layer as compared to a plating barrel rotating at a constant rate that is less than these rates. Additionally, these two concepts of intermittent pausing of the barrel rotation and changing the rate of the barrel rotation can be combined to achieve a desired loading rate of the highly dense luminescent particles throughout the plated metal layer. As a result, embodiments of the present invention may incorporate such variables in the tumbling process to achieve desired deposition effects.

FIG. 8 illustrates a system and process 800 for electroplating a metal layer with embedded luminescent particles (e.g., an upconverting phosphor or any of the other such particles disclosed herein or their equivalents) on metal objects 807 (e.g., metal parts, metal washers, coinage, etc.). In a first example (herein referred to also as "Example 1"), upconverting phosphor particles (e.g., approximately 90 g) are added to a copper cyanide electrolytic solution (e.g., approximately 9 L), such as commercially available from Technic, Inc. The resultant plating solution 801 may be heated (e.g., approximately to 150° F.). The plating solution 801 may be agitated by a mechanical impeller (not shown) or stir bar or recirculation pump 804 to maintain the upconverting phosphor particles in better suspension in the plating solution 801. Copper anodes 802 submersed into the plating solution 801 may be coupled to a positive lead of a power supply 803. Metal objects 807 (e.g., mild steel, stainless steel, copper, brass, titanium, or bronze) may be cleaned and placed into a plating barrel 806, which may be connected to the other lead of the power supply 803. The dimensions of the objects 807 may be recorded to determine the proper area of metal to be plated. For example, the area of a copper washer 807 may be 1.25 in$^2$. To plate ten copper washers 807 at 25 a.s.f. (amps/foot$^2$), the power supply 803 may be set to deliver 2.2 amps of current.

Figure 2:
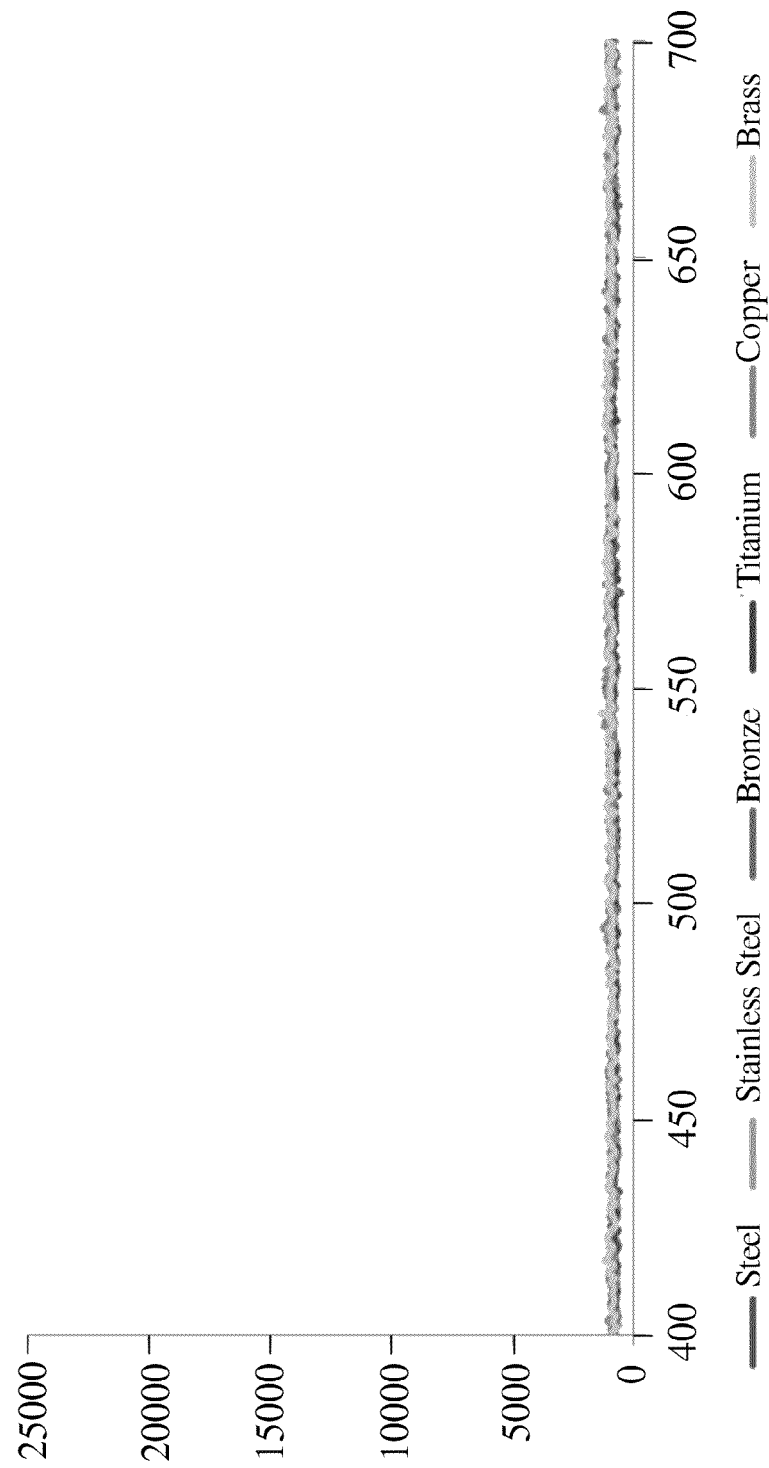
FIG. 2 shows emission scans of metal substrates before plating.

Once the solution 801 is energized, the plating process begins. In addition, the plating barrel 806, which may typically rotate at 30 rpm, may be modified to rotate at different speeds and/or at intermittent intervals through controls to its motor 805. For example, the barrel 806 may be rotated for 4 seconds (s) and stopped for 16 seconds (other alternative intermittent cycles may be used, such as rotate for 16 s and pause the rotation for 64 s). This process modification allows for the phosphor particles to better adhere to the metal substrate 807 surface as the copper being applied via electroplating is building around the particles. If the plating barrel 806 was permitted to rotate continuously (i.e., without stopping on an intermittent basis), a majority of the phosphor particles would become dislodged from the objects 807, and the overall content of the phosphor particles in the plated surfaces may be minimized, if not completely eliminated. After a period of time (e.g., 60 minutes) under these conditions, the process may be completed. Emission spectra of the objects 807 before and after such plating examples were collected for different processes, in which stainless steel, bronze, steel, copper, titanium, and brass were each separately plated with phosphor particles. Emission spectra were collected (such as with a system 1100) on a Horiba FluoroLog-3 spectrofluorometer. FIG. 2 shows graphs of such emission spectra before the plating process clearly indicating no signals detected by detector 1103 in response to excitation with energy 1110 by an illumination source 1101. FIG. 1 shows graphs (which may be displayed on a display 1103) of such emission spectra after each of the plating processes, which clearly indicate successful platings of each of the metal layers with the embedded phosphor particles, since each exhibited an emission of energy detected by detector 1103 in response to illumination 1110 by the source 1101.

Figure 5:
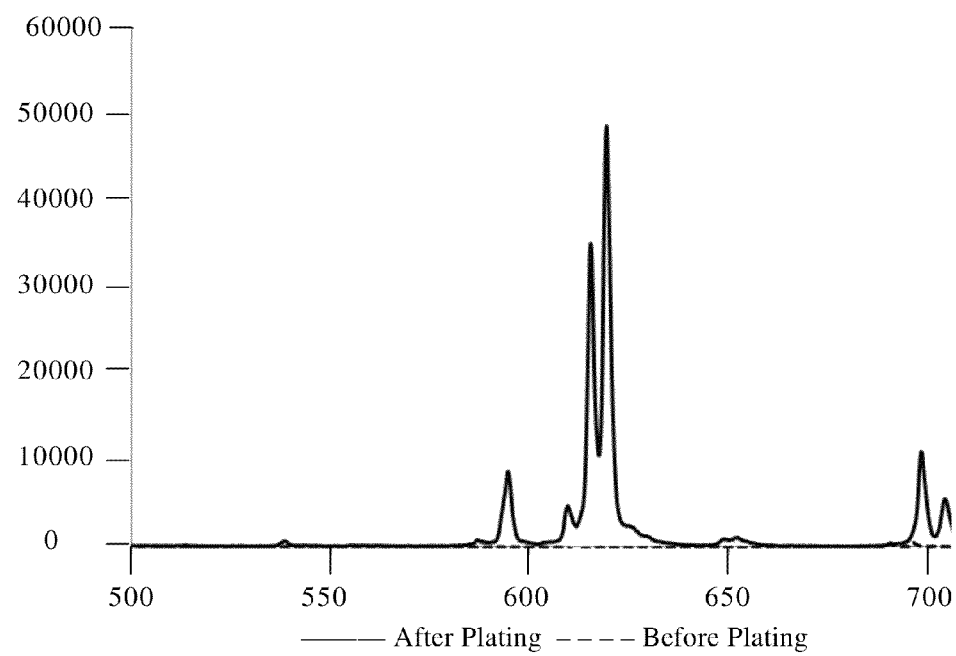
FIG. 5 shows fluorescence emission scans of metal substrates in Experiment 3.

Referring again to FIG. 8, in another example, approximately 90 grams of UV-Red phosphor (commercially available from Nemoto & Co., LTD) may be added to approximately 9 liters of copper/zinc cyanide electrolytic solution commercially available from Technic, Inc. The temperature of the resultant solution 801 may be brought to approximately 165° F. The solution 801 may be agitated by a mechanical impeller or stirrer or a pump 804 to maintain the downconverting phosphor particles in a satisfactory suspension. Brass anode(s) 802 submersed into the plating solution 801 may be coupled to the positive lead of the power supply 803. Bronze washers 807 may be cleaned and placed into a plating barrel 806. The dimensions of the washers may be recorded to determine the proper area of metal to be plated. In this example, the area of a bronze washer 807 was 1.25 in². To plate ten bronze washers 807 at 25 a.s.f., the power supply 803 may be set to deliver 2.2 amps of current. Once the solution 801 is energized, the plating process begins. In this example, the barrel 806 may rotate for 4 seconds and stop for 16 seconds (other alternative intermittent cycles may be used, such as rotate for 16 s and pause the rotation for 64 s). This process modification allows for the phosphor particles to be better adhered to the metal substrate surface as the brass being applied via electroplating is building around the particles. After approximately 60 minutes under these conditions, the plating is stopped. For analysis of the plated washers 807, the fluorescence spectra were collected from a blank washer before plating and a washer post-plating. Fluorescence spectra were obtained (such as with a system 1100) on an Ocean Optics USB4000 spectrometer (1103, 1104), while illumination 1110 was supplied by a handheld short wave UV lamp 1101 (commercially available from Entela MineralLight, Lamp Model No. UVGL-58). As shown in FIG. 5, the spectra record 1105 from the plated washer was consistent with that of the raw phosphor, while the blank washer before plating showed no appreciable fluorescence.

Figure 6:
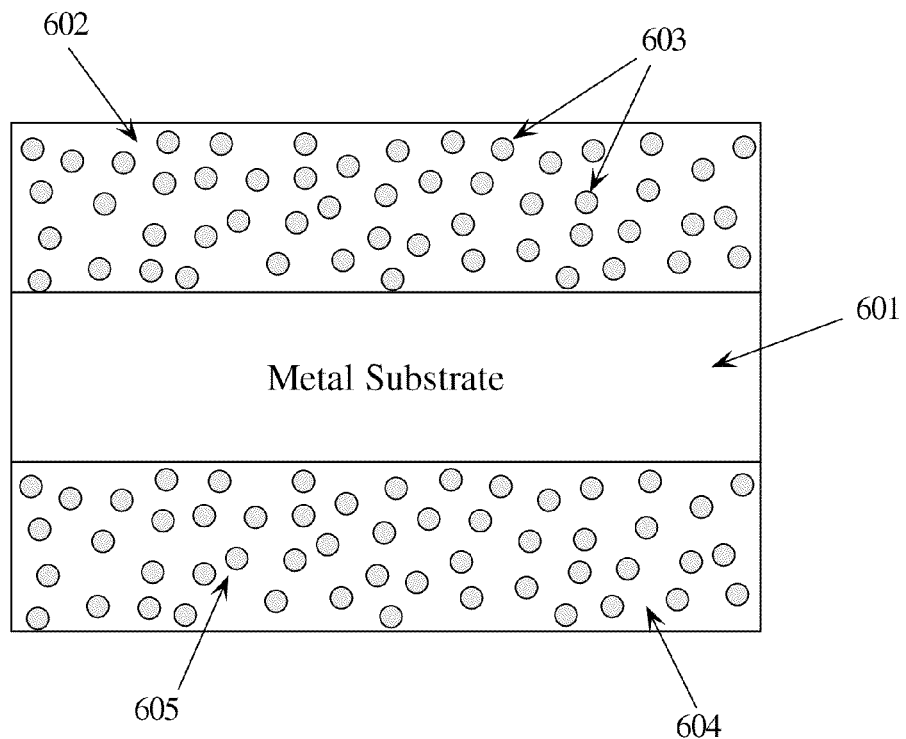
FIG. 6 illustrates embodiments of the present invention.

A series of experiments were performed to determine optimal parameters for embodiments of the electrolytic plating procedures disclosed herein. Referring to FIG. 8, a copper cyanide electrolytic plating solution 801 was prepared per Example 1 initially without any security phosphor. Fifty coin blanks 807 (e.g., 17 millimeters (mm) in diameter, 2 mm thick) were plated in each experiment. Variables (parameters) tested included: (1) phosphor loading or concentration in the plating solution 801 (5, 10, and 15 g/L); (2) barrel 806 tumbling rate and any intermittence or pausing of the tumbling (30 rpm constant tumble without pausing of the tumbling, 4 seconds of tumble (at 30 rpm)/16 seconds of pause of the tumbling, and 16 seconds tumble (at 30 rpm)/64 seconds pause of the tumbling); and (3) current density (10, 20, and 30 a.s.f.) from the power supply 803. For all examples, the process 800 was operated to obtain a plating thickness on the coin blanks 807 between 30 µm and 50 µm. For these experiments, an upconverting IR to Green rare earth oxysulfide phosphor was used, though similar results would be obtained for the other luminescent particles disclosed herein and their equivalents. The emission spectra were collected and integrated (such as with devices 1103, 1104) under similar conditions as in the first example. The average signal intensity (energy detected 1103 as being emitted by the embedded particles in response to illumination or excitation 1110 from a source 1101) for a series of 10 coins 807 for each experiment (both sides, i.e., as shown in FIG. 6, such metal layers 602, 604 with embedded luminescent particles 603, 605 may be deposited on all sides of a metal substrate 601) is reported in Table 1.

TABLE 1

| Experiment No. | Phosphor Loading (g/L) | Current Density (a.s.f.) | Tumble Rate/ Intermittence | Signal Intensity (10 Coin Average) |
| --- | --- | --- | --- | --- |
| 1 | 0 | 30 | Constant | 0 |
| 2 | 5 | 30 | 16 s/64 s | 1549 |
| 3 | 10 | 30 | 16 s/64 s | 2429 |
| 4 | 15 | 30 | Constant | 56 |
| 5 | 15 | 30 | 4 s/16 s | 194 |
| 6 | 15 | 10 | 16 s/64 s | 2085 |
| 7 | 15 | 20 | 16 s/64 s | 3419 |
| 8 | 15 | 30 | 16 s/64 s | 4201 |

What these experiments indicate is that although phosphor loading in the plating solution and current density do have an effect on the signal intensity, a greater effect results from the utilization of the intermittent tumbling process. In all experiments the uniformity and luster of the metal finish on the coin blanks exceeded acceptable criteria. This is not an expected result, since a constant tumbling process would typically lead to a better plating of the objects.

Figure 9:
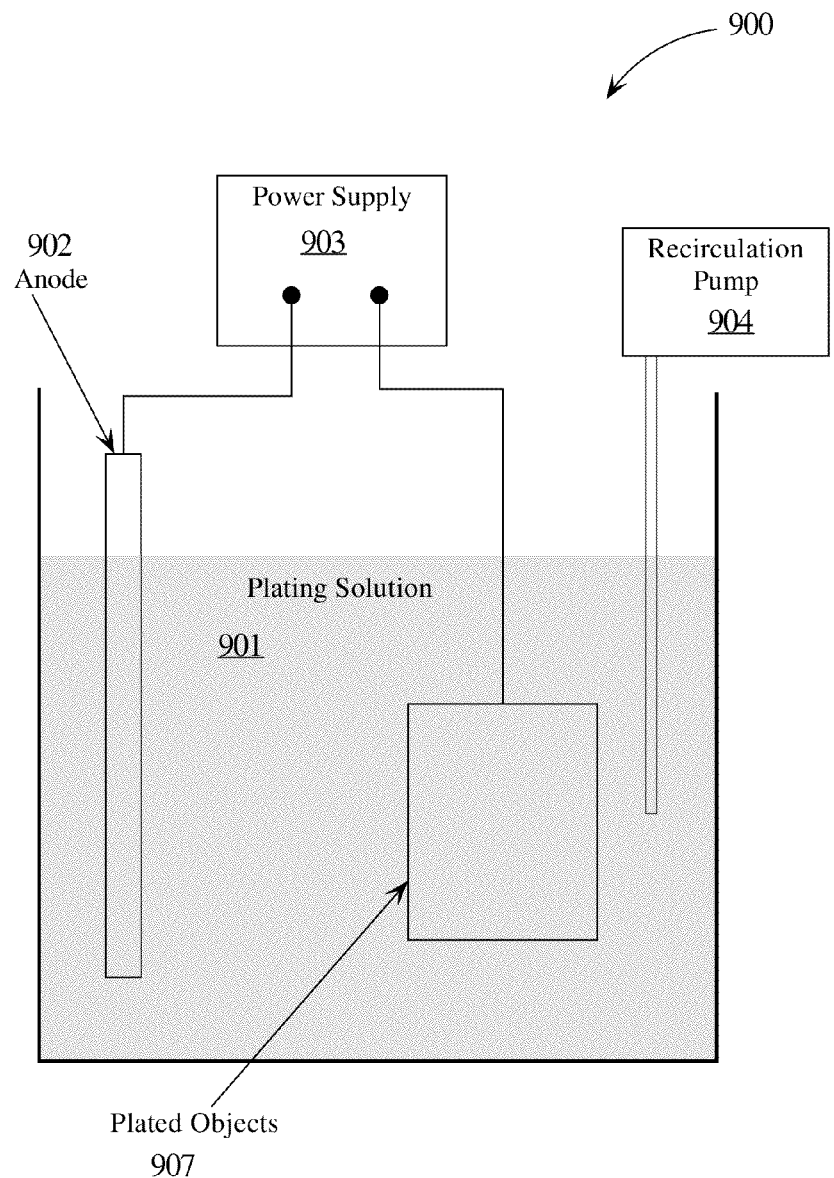
FIG. 9 illustrates a dip plating system according to embodiments of the present invention.

FIG. 9 illustrates a dip or rack plating process and system 900, similar to process and system 800, with labeled items 901-904 and 907 configured and utilized similarly to labeled items 801-804 and 807, though without utilizing a rotating barrel 806.

Figure 4:
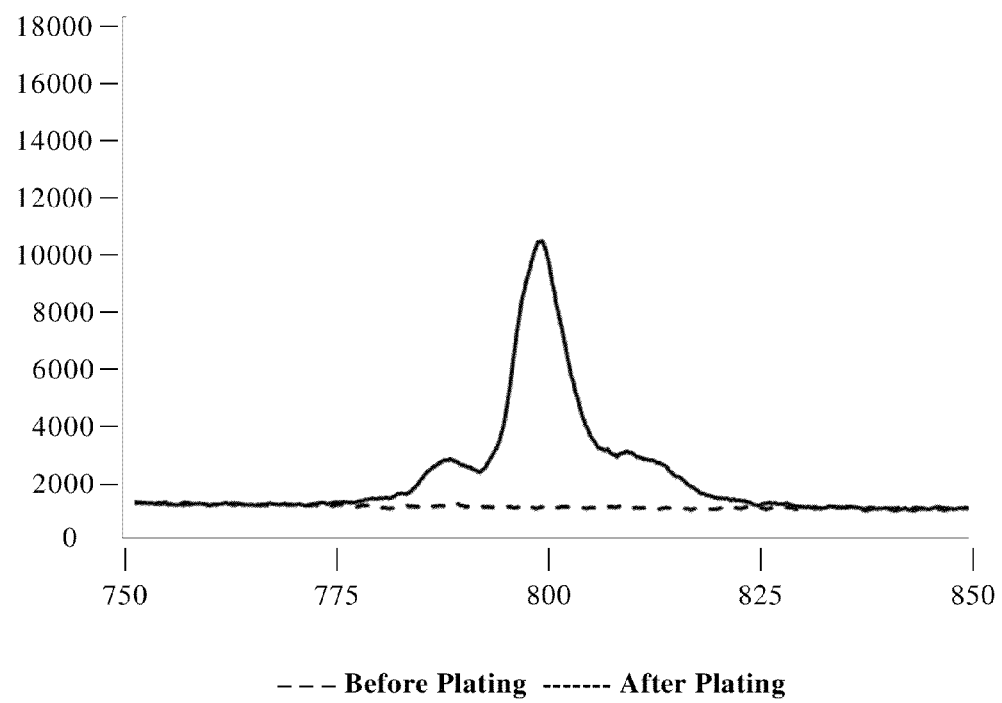
FIG. 4 shows emission spectra of a coin substrate before and after plating.
Figure 10:
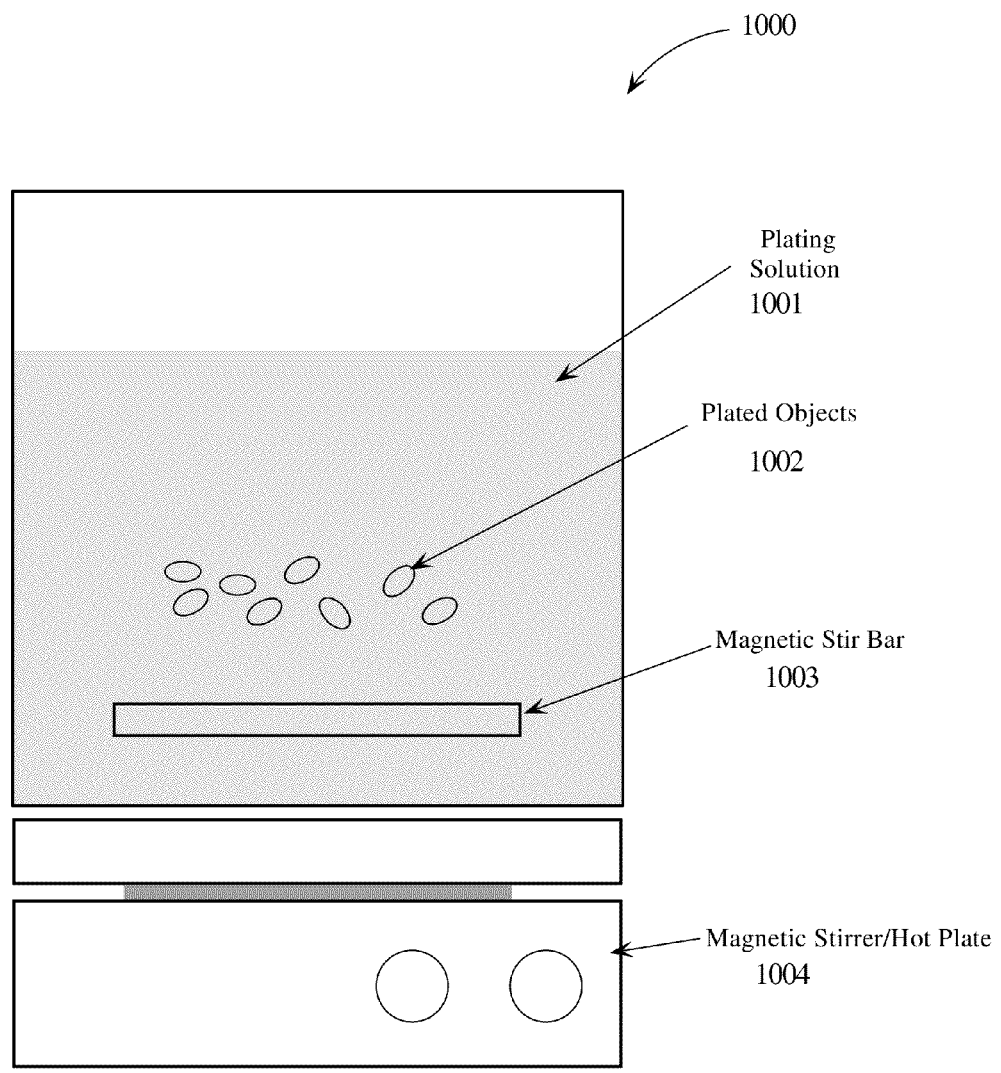
FIG. 10 illustrates an electroless plating system according to embodiments of the present invention.

FIG. 10 illustrates a system and process 1000 for electroless plating of a metal layer with embedded luminescent particles (e.g., an upconverting phosphor or any of the other such particles disclosed herein or their equivalents) onto objects 1002, in accordance with embodiments of the present invention. As a non-limiting example, nickel(II) sulfate (10.5 grams (g)), sodium hypophosphite (12 g), lactic acid (10 milliliters (mL)), propionic acid (1.5 mL), lead(II) acetate (3 parts per million (ppm)), and upconverting phosphor particles (e.g., IR-Blue) (2 g) may be added to approximately 500 mL of distilled water to produce a plating solution 1001. Other equivalent materials may be utilized instead. The plating solution 1001 may be stirred by a magnetic stirrer 1004 and magnetic stir bar 1003 (e.g., at approximately 170 revolutions per minute (rpm)) to maintain a satisfactory suspension of the phosphor particles in the solution 1001. The magnetic stirrer may incorporate a hot plate 1004 to heat the solution 1001. To the solution 1001 may be added metal objects 1002 to be plated (e.g., nickel-coated steel coin blanks (substrates)); after being submerged in the solution 1001 (e.g., for approximately 2 hours), the objects 1002 are removed and may be washed with distilled water. For the noted example, an analysis was performed (such as with a system 1100) on a Horiba FluoroLog-3 spectrofluorometer. FIG. 4 shows emission spectra of the coin substrate 1002 before and after plating. Before the plating process there was no energy emitted by the coin substrate 1002 in response to the excitation by an energy (illumination) source 1101, while a significant energy response is shown in the graph due to energy emitted by the upconverting phosphor particles embedded in the plated metal layer on the coin substrate 1002, indicating a successful plating process of the embedded phosphor particles.

Some embodiments of the present invention apply multiple electrodeposited metal layers to a metal substrate where each layer contains particles that emit at different wavelengths from the particles in the other layer(s), which enables a determination of an amount of wear according to the wavelength of light that is detected. Any of the processes disclosed herein may be used for depositing such multiple layers.

Figure 7:
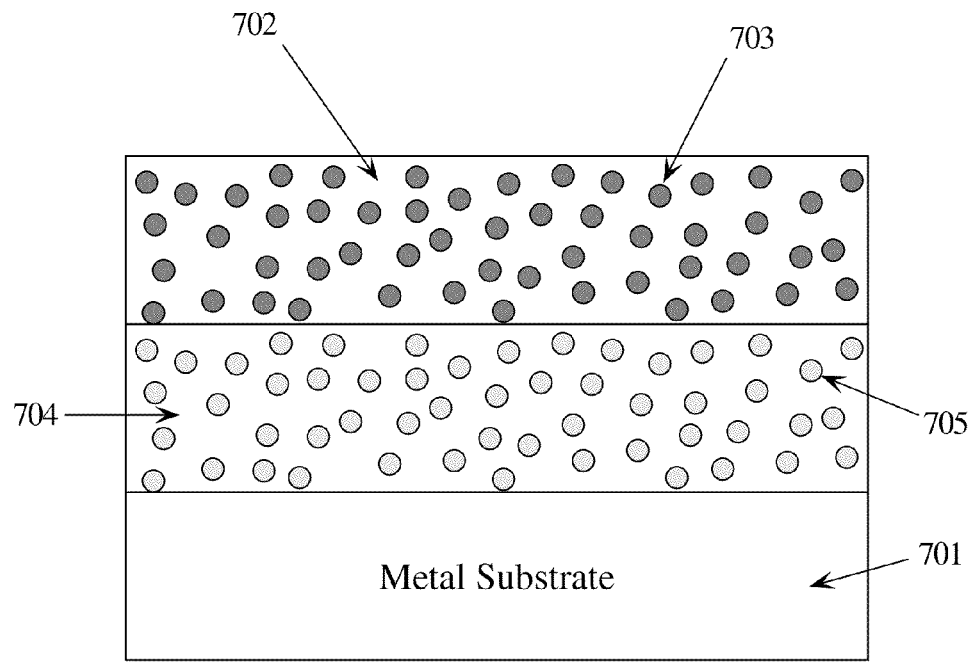
FIG. 7 illustrates embodiments of the present invention.

For example, referring to FIG. 7, a metal part (substrate) 701 may contain two or more separate metal (e.g., nickel) layers 702, 704 (e.g., each 10 μm thick) with embedded inorganic (e.g., phosphor) particles 703, 705 that emit energies at two or more different wavelengths when appropriately excited. An outermost surface layer 702 may contain particles 703 that emit energy at a first wavelength (e.g., 480 nm). A second layer 704 may contain particles 705 that emit energy at a second wavelength (e.g., 545 nm). Initially, the outermost surface layer 702 would emit its 480 nm energy until the first 10 μm surface layer 702 is sufficiently worn away, enabling the second 10 μm layer 704 to emit energy at 545 nm when appropriately excited. When this layer 704 is sufficiently worn away it will reveal the substrate 701 (or, alternatively, further metal layer(s) with additional embedded particle(s)). The foregoing may indicate to a user that the metal part needs to be replaced or resurfaced. For example, a user may wish to replace or resurface a part when it can be excited with an energy that causes the 545 nm wavelength of energy to be detected. Such embodiments of the present invention are not limited to these particular layer thicknesses, wavelengths, and/or numbers of layers.

A number of embodiments of the invention have been described. Nevertheless, it will be understood that various modifications may be made without departing from the spirit and scope of the invention. For example, the periods of barrel rotation may comprise any variations of periods of time where the barrel is rotated and the barrel is not rotated, and such periods of rotation and pausing of the rotation may be rotations of the barrel at different speeds from each other. For example, pausing of the rotation may be substituted with slower rotation speeds, including very slow speeds, to achieve desired deposition variables. Accordingly, other embodiments are within the scope of the following claims.

What is claimed is:

1. A method for depositing a metal layer having embedded luminescent particles onto a metal substrate, comprising:
   mixing the luminescent particles with a metallic material to produce a plating solution, wherein—the luminescent particles have a density of 5.0 g/cm3 or more;
   inserting the metal substrate into the plating solution; and
   performing an electroplating process to coat the metal substrate on all sides with a metal layer, wherein the metal layer contains embedded luminescent particles from the plating solution,
   wherein the electroplating process includes a rotating barrel in which the metal substrate is contained when inserted into the plating solution, wherein tumbling from the process deposits the luminescent particles in the metal layer that is formed during the electroplating process such that the luminescent particles are physically distributed throughout the entirety of the metal layer and a portion of the luminescent particles are embedded on or near an outer-most surface of the metal layer in a manner to be detectable by UV, visible or infrared light.

2. The method of claim 1, wherein the electroplating process comprises rotating the barrel on an intermittent basis while the metal layer is electroplated onto the metal substrate.

3. The method of claim 2, wherein the intermittent basis is a rotation of the barrel for one or more periods of time that are less than periods of time the barrel is not rotated.

4. The method of claim 3, wherein the one or more periods of time are each approximately 25% of each of the periods of time the barrel is not rotated.

5. The method of claim 1, wherein the density of the luminescent particles is greater than 7.4 g/cm$^3$.

6. The method of claim 1, wherein the luminescent particles comprise rare earth doped yttrium oxide-based phosphors.

7. The method of claim 1, wherein the luminescent particles comprise rare earth doped gadolinium oxide-based phosphors.

8. The method of claim 1, wherein the metal substrate comprises coins or coin blanks.

9. The method of claim 8, wherein the coins or coin blanks comprise a material selected from the group consisting of stainless steel, bronze, steel, copper, titanium, and brass, and the electroplated metal layer is selected from the group consisting of nickel, copper, and brass.

10. The method of claim 1, wherein the metal substrate comprises coin blanks, which are then produced into a coin.

11. The method of claim 1, wherein the electroplating process comprises both (a) rotating the barrel on an intermittent basis while the metal layer is electroplated onto the metal substrate, and (b) rotating the barrel at a variable velocity, such that the barrel is rotated at a first velocity for a first time period and a second velocity for a second time period that is at least as long in duration as the first time period.

12. A method for depositing a metal layer having embedded luminescent particles onto a metal substrate, comprising:
   mixing the luminescent particles with a metallic material to produce a plating solution, wherein the luminescent particles have a density of 5.0 g/cm3 or more;
   inserting the metal substrate into the plating solution; and
   performing an electroplating process to coat the metal substrate on all sides with a metal layer, wherein the metal layer is optically dense and selected from the group consisting of nickel, copper, zinc, brass, gold, silver and platinum and the metal layer contains embedded luminescent particles, wherein the electroplating process includes a rotating barrel in which the metal substrate is contained when inserted into the plating solution, wherein tumbling from the process deposits particles in the metal layer that is formed during the electroplating process such that the luminescent particles are physically distributed throughout the entirety of the metal layer and a portion of the luminescent particles embedded on or near an outermost surface of the metal layer in a manner to be detectable by UV, visible or infrared light.

* * * * *